United States Patent
Lambert

(10) Patent No.: US 10,994,379 B2
(45) Date of Patent: May 4, 2021

(54) LASER DEPOSITION PROCESS FOR A SELF SHARPENING KNIFE CUTTING EDGE

(71) Applicant: George H. Lambert, Stuart, FL (US)

(72) Inventor: George H. Lambert, Stuart, FL (US)

( * ) Notice: Subject to any disclaimer, the term of this patent is extended or adjusted under 35 U.S.C. 154(b) by 0 days.

(21) Appl. No.: 16/719,048

(22) Filed: Dec. 18, 2019

(65) Prior Publication Data

US 2020/0215646 A1 Jul. 9, 2020

Related U.S. Application Data

(60) Provisional application No. 62/788,170, filed on Jan. 4, 2019.

(51) Int. Cl.
| B23P 15/28 | (2006.01) |
| B23K 26/342 | (2014.01) |
| B23K 101/20 | (2006.01) |

(52) U.S. Cl.
CPC ............ B23P 15/28 (2013.01); B23K 26/342 (2015.10); *B23K 2101/20* (2018.08)

(58) Field of Classification Search
CPC ....... B23P 15/28; B23K 26/34; B23K 26/342; B23K 2101/20
USPC ....... 76/DIG. 8, 101.1, 104.1, 112, 115, 116, 76/119; 30/345–346.5, 346.53, 346.54, 30/350, 357
See application file for complete search history.

(56) References Cited

U.S. PATENT DOCUMENTS

| 3,446,932 A | 5/1969 | Belopitov |
| 3,666,906 A | 5/1972 | Byrne |
| 3,681,846 A | 8/1972 | Gerber |
| 3,762,243 A | 10/1973 | Borrkfield |
| 3,911,579 A | 10/1975 | Lane et al. |
| 3,932,231 A | 1/1976 | Hara et al. |
| 4,299,860 A | 11/1981 | Schaefer et al. |
| 4,488,882 A | 12/1984 | Dausinger et al. |
| 4,653,373 A | 3/1987 | Gerber |
| 4,896,424 A | 1/1990 | Walker |
| 5,154,945 A * | 10/1992 | Baldwin ................. C23C 16/27 423/446 |
| 5,387,447 A * | 2/1995 | Slutz ...................... B21C 3/025 76/107.1 |
| 5,431,071 A | 7/1995 | Williams |
| 5,477,616 A | 12/1995 | Williams et al. |
| 5,488,774 A * | 2/1996 | Janowski ................ B26B 21/60 30/346.53 |
| 5,697,994 A | 12/1997 | Packer et al. |

(Continued)

OTHER PUBLICATIONS

Roseville Rock Rollers, Mohs hardness Scale, https://www.rockrollers.com/features/hardness.html, 2020.*

*Primary Examiner* — Jason Daniel Prone

(74) *Attorney, Agent, or Firm* — McHale & Slavin, P.A.

(57) ABSTRACT

A method for treating a knife cutting edge with a laser deposition (sintering) process using a composition coating such as a diamond powder or a substance above 5 on the Mohs scale of mineral hardness. The coating providing an abrasion resistant cutting edge and creates a differential hardness on the total cutting edge. The differential hardness extends the cutting ability of the knife through a wear-resistant surface on a treated surface and a faster wear on an untreated surface causing the cutting edge to be self sharpening as the untreated surface wears away.

6 Claims, 5 Drawing Sheets
(4 of 5 Drawing Sheet(s) Filed in Color)

(56) References Cited

U.S. PATENT DOCUMENTS

| | | | |
|---|---|---|---|
| 5,799,549 A * | 9/1998 | Decker | B26B 21/60 |
| | | | 76/104.1 |
| 5,940,975 A * | 8/1999 | Decker | B26B 21/60 |
| | | | 30/346.54 |
| 5,992,268 A * | 11/1999 | Decker | B26B 21/60 |
| | | | 76/104.1 |
| 6,067,784 A | 5/2000 | Jordan | |
| 6,086,684 A | 7/2000 | Saito et al. | |
| 6,109,138 A | 8/2000 | Upton | |
| 6,122,564 A * | 9/2000 | Koch | B23K 26/32 |
| | | | 700/123 |
| 6,289,593 B1 * | 9/2001 | Decker | B26B 21/60 |
| | | | 30/346.54 |
| 6,336,950 B1 | 1/2002 | Koizumi et al. | |
| 6,701,627 B2 | 3/2004 | Korb et al. | |
| 6,800,383 B1 | 10/2004 | Lakhotkin et al. | |
| 7,060,367 B2 * | 6/2006 | Yamada | B26B 21/56 |
| | | | 30/346.53 |
| 7,166,371 B2 | 1/2007 | Lathotkin et al. | |
| 7,882,640 B2 * | 2/2011 | Zhuk | B26B 21/222 |
| | | | 30/50 |
| 7,897,266 B2 * | 3/2011 | Everett, Jr. | B26B 19/143 |
| | | | 30/346.53 |
| 7,992,309 B2 * | 8/2011 | Fleming | A61F 9/0133 |
| | | | 30/350 |
| 8,096,221 B2 * | 1/2012 | Tarrerias | C23C 24/10 |
| | | | 83/835 |
| 8,109,176 B1 * | 2/2012 | Kooima | A01F 29/06 |
| | | | 76/104.1 |
| 8,505,414 B2 * | 8/2013 | Gulf | B23D 65/00 |
| | | | 76/101.1 |
| 8,592,711 B2 | 11/2013 | Lambert | |
| 8,769,833 B2 * | 7/2014 | Gulf | B23P 15/40 |
| | | | 30/346.54 |
| 8,946,585 B2 * | 2/2015 | Kappmeyer | B22F 3/1055 |
| | | | 76/101.1 |
| 9,027,443 B2 * | 5/2015 | Zhuk | B26B 21/60 |
| | | | 76/104.1 |
| 2004/0182216 A1 * | 9/2004 | Morrison | B27B 33/14 |
| | | | 83/661 |
| 2006/0185254 A1 | 8/2006 | Hirai et al. | |
| 2007/0163128 A1 | 7/2007 | Tarrerias | |
| 2010/0325902 A1 * | 12/2010 | Dutta | B26B 9/00 |
| | | | 30/346 |
| 2011/0010950 A1 * | 1/2011 | Madeira | C23C 16/006 |
| | | | 30/346.54 |
| 2011/0183271 A1 * | 7/2011 | Lee | B23K 26/38 |
| | | | 83/13 |
| 2012/0144680 A1 * | 6/2012 | Scillia | B23K 26/0846 |
| | | | 30/350 |
| 2014/0026730 A1 * | 1/2014 | Dutta | B26B 9/00 |
| | | | 83/651 |
| 2016/0096282 A1 * | 4/2016 | Doyle | B05D 3/107 |
| | | | 30/346.53 |
| 2016/0281189 A1 * | 9/2016 | Fujisawa | C22C 38/00 |

* cited by examiner

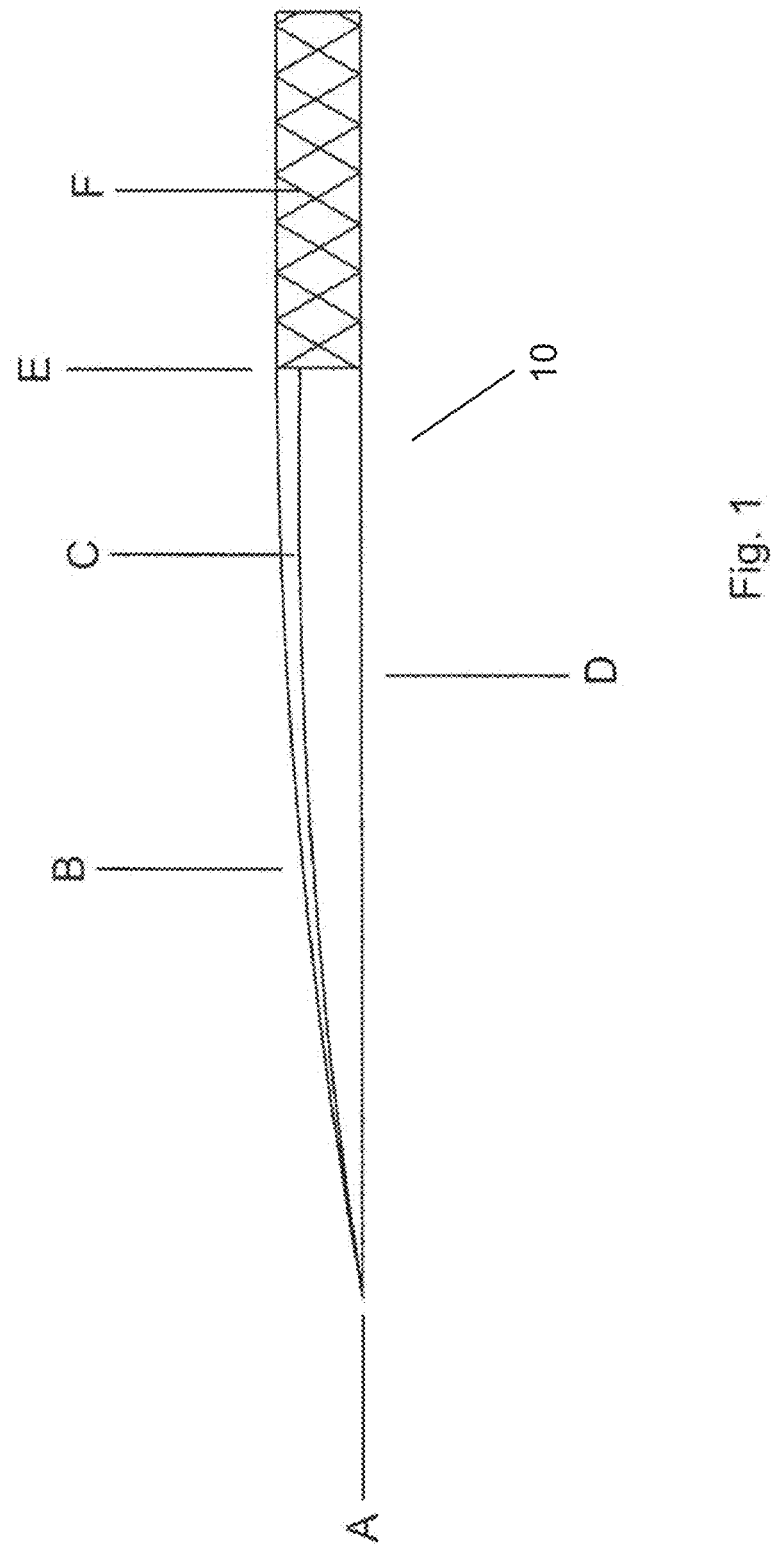

LASER DEPOSITION PROCESS FOR A SELF SHARPENING KNIFE CUTTING EDGE

PRIORITY CLAIM

In accordance with 37 C.F.R. § 1.76, a claim of priority is included in an Application Data Sheet filed concurrently herewith. Accordingly, the present invention claims priority to U.S. Provisional Patent Application No. 62/788,170, entitled "LASER DEPOSITION PROCESS FOR A SELF SHARPENING KNIFE CUTTING EDGE", filed Jan. 4, 2019. The contents of which the above referenced application is incorporated herein by reference.

FIELD OF THE INVENTION

This invention relates to metal treatment and in particular to a method of Laser Sintering/Bonding a wear-resistant cutting edge to form a high endurance cutting edge that is self sharpening.

BACKGROUND OF THE INVENTION

It has long been considered desirable to provide a cutting edge which will reduce or minimize the tendency for the edge to wear or abrade off, thereby minimizing the need to re-sharpen. For this purpose, knives used for cutting and the like, such as hunting, camping, fishing, kitchen, cutlery, meat or butchering industries and/or general purpose or special purpose knives are generally unsuitable for extended use before having to be re-sharpened.

Conventional cutting edges found on knives, scissors, shears, and the like are provided with a hardened blade or treated coating such as nitrating, sputtering, sintering, hot spraying, bonding or adhesion coated or other means to extend its edge holding characteristic. Consequently, it is necessary to use a sharpening method or system to re-sharpen the blade often.

The cutting edge of a blade, such as a knife blade, also has the disadvantage that it wears more rapidly and is damaged more readily, inasmuch as the area of the cutting surface due to abrasion and wear is markedly reduced owing to the removal of metal by abrasion and also because the cutting surface constitutes a material or finish that is continuously removed.

U.S. Pat. No. 3,681,846 discloses the advantages of tungsten carbide for use with reciprocating knife blades. In this disclosure a knife blade having outer layers of a relatively soft carrier material, such as steel or aluminum, and an inner layer of relatively hard material such as tungsten carbide. The inner layer may be deposited on one or the other, or both outer layers, or may be bonded thereto as a separate member, or may be inserted in cavities defined by these outer layers of carrier material. When assembled, the thickness of the harder inner layer varies in the longitudinal direction so that when the longitudinally extending cutting edge is used to cut in a reciprocating action, said edge will wear away in an uneven fashion producing a serrated edge which need not be sharpened as frequently as a conventional knife blade.

U.S. Pat. No. 3,762,243 discloses a method of making sharp-edged cutting elements in which one of two opposite surfaces of a work piece has a thin layer added thereto.

U.S. Pat. No. 3,666,906 discloses a carbide deposition structure which includes a carbide electrode and workpiece, a low voltage, low frequency oscillator operably associated with the switch for turning the switch on and off and a high frequency, high voltage oscillator for initiating an arc between the electrode and workpiece.

U.S. Pat. No. 3,446,932 discloses a method and apparatus for the coating of a substrate with conductive material wherein a pendulously supported coating electrode disk carried by an oscillation-damped arm bears against substrate resiliently supported at two spaced-apart locations (e.g. a continuous tensioned band or endless conveyor carrying a number of bodies). A discharge is generated between the disk, which may have a continuous or discontinuous surface and the substrate while the disk is rotated in contact with the substrate. The discharge also serves to carry portions of the electrode disk material onto the substrate.

U.S. Pat. No. 3,911,579 discloses an improved razor blade and methods of making the same wherein the cutting edge formed by two intersecting surfaces is sputter deposited with a refractory material which is subsequently overlaid with a sputter deposited coating of material displaying adhesion to a final lubricious coating.

U.S. Pat. No. 4,653,373 discloses a knife blade that has a cutting portion which includes two adjoining faces defining a cutting edge and comprises a relatively soft or high wear base material and a relatively hard or low wear coating. One of the faces is formed by the relatively hard coating and the other face is formed by the relatively soft base material.

U.S. Pat. No. 4,299,860 discloses a method of impregnating the surface of a metal substrate with wear resistant particles to impart wear resisting characteristics to the surface. The substrate surface is subjected to a relatively moving high-powered laser beam to cause localized surface melting in passes there across, and hard wear resistant particles injected into the melt.

U.S. Pat. No. 3,932,231 discloses surface-coated cemented carbide articles. This method comprises providing a 3-50% by weight dispersion of fine powders of 20 microns or less containing 50% or more of titanium carbide in a liquid consisting mainly of an organic solvent, applying a DC voltage of 10-500 volts to the surface of tungsten carbide base cemented carbides containing 4-30% of a binder metal in said dispersion to thus cause electrophoretic deposition of the fine powders thereon, heating the coated surface at a temperature of 1260-1550 degree C. in vacuum or in a reducing or inert atmosphere and thereby forming a coating layer consisting mainly of titanium carbide of 100 microns or less on the surface of the cemented carbides.

U.S. Patent No. 2006/0185254 discloses a diamond cutting-edge material and a manufacturing method thereof in that the diamond particles thinly coat with a metallic thin film compared to the conventional Nickel (NI) coating, and thus the present invention provides an edge including a plurality of diamond particles having a 100 um or less diameter at least partially coated with Titanium.

U.S. Pat. No. 6,701,627 discloses a utility knife blade that involves joining a tool steel wire to a front edge of an alloy steel backing strip. The composite strip is then annealed, and the annealed strip is straightened to eliminate any camber therein.

U.S. Pat. No. 6,800,383 discloses a tungsten carbide alloyed with fluorine in amounts up to 0.5 wt % and possibly with fluorocarbon compositions by chemical vapor deposition, in which tungsten hexafluoride, hydrogen and a carbon-containing gas are used. The tungsten carbide coatings are deposited on construction materials and items made from them.

U.S. Pat. No. 7,166,371 discloses a cutting tool having a blade coated on one side with a hard coating living a laminar or layered microstructure. The coating includes at least one layer made of tungsten carbides substantially or entirely free of metallic tungsten.

U.S. Pat. No. 6,336,950 discloses an electrode rod for spark alloying of high melting compounds such as carbide and boride.

U.S. Pat. No. 5,477,616 and 5,431,071 disclose knife blades and methods of production by providing a knife blade with a cutting edge having a harder material than the body of the blade comprising a v-shaped cutting edge formed on a blank, and such that the cutting tip lies substantially central of the width of the blank with a coating of a material harder than the material of the blank.

U.S. Pat. No. 6,109,138 discloses a knife blade including a cutting edge formed on a blank. One side of the edge is provided with a coating formed by a particulate material in a matrix. The matrix is softer than the particulate material, and the coating is such that a considerable number of the particulates project from the matrix thereby defining a cutting tip on the cutting edge. The coating is cemented carbide such as tungsten carbide. The coating is provided by high pressure velocity oxy-fuel.

U.S. Pat. No. 4,896,424 discloses a composite cutting blade for a knife or other cutting instrument. The blade is formed from a body section made of a strong tough material formed with a dovetail configuration along one edge thereof and a cutting edge section made of a hard durable material that has a matching dovetail configuration along one edge. In one embodiment the body is titanium and the cutting edge is high carbon stainless steel.

U.S. Pat. No. 4,488,882 discloses a method of embedding tungsten carbide particles on an edge of a cutting tool such as a saw blade, a drill, or the like. The cutting edge is partially melted by an energy beam, for example a laser beam, or an electron beam. A laser beam is preferred since, then, the process can be carried out in air, or in a protective gas atmosphere, rather than in a vacuum. The beam partially melts the cutting edge and the granules of the hard metal particles, such as tungsten carbide.

U.S. Pat. No. 6,067,784 discloses a hard facing for an agricultural machine blade which contains tungsten carbide of to 100 um in particle size and a hardness of greater than 1400 HV in a matrix with hardness of 500 to 800 HV.

U.S. Pat. No. 6,086,684 discloses an electric discharge surface treating method providing a nitriding treatment, performed on a coated layer.

US 2007/0163128 discloses the fabricating of a blade wherein powder is placed upon a free edge and subjected to a laser beam to form a bead, the bead is then formed into a cutting edge. Tarrerias requires a uniform deposited bead of power, the composition of the powder must be uniform at all points along the bead and the powder is projected under pressure.

U.S. Pat. No. 6,336,950 discloses an electrode rod for spark alloying. Koizumi teaches an electrode by use of a self propagating high temperature synthesis as applied to the preparation of an electrode for forming a high melting compound with an intense heat emission.

U.S. Pat. No. 5,697,994 discloses a cutting tool wherein a hard layer is layer bonded to the substrate at high temperature and high pressure, the hard layer consists of polycrystalline diamond or polycrystalline cubic boron nitrate, a refractory material section from the group of titanium carbonitride and titanium aluminum carbonitride, and a cobalt phase including adjuvant alloying materials.

U.S. Pat. No. 8,592,711 discloses a self sharpening cutting edge formed from a titanium alloy shank having a Rockwell C hardness less than 65 with a layer of carbide based electrode material having a material deposit of about 0.0002-0.0003 inches when said first bevel has an angle of between 10-15 degrees, said layer of electrode having a material deposit of about 0.0003-0.0004 inches when said first bevel has an angle of between 15-20 degrees, said layer of electrode material having a material deposit of about 0.0004-0.0005 inches when said first bevel has an angle of between 20-25 degrees, wherein said zone of differential wears before said first bevel allowing said edge to remain sharp.

What is needed is an apparatus and method that allows the average consumer to treat a knife cutting edge with an alloy of various carbides to form a high cutting edge that is self sharpening.

SUMMARY OF THE INVENTION

Disclosed is an apparatus and method for treating a knife cutting edge that is self sharpening. The cutting edge having one side of its bevel treated with an Laser Beam plus compound coating to create a wear resistant surface by Laser bonding to the base material with a laser deposition (sintering) process and a compound coating such as a diamond powder or a substance above 5 on the Mohs scale of mineral hardness. The coating provides an abrasion resistant cutting edge and creates a differential hardness on the total cutting edge, thereby extending its cutting ability through a wear-resistant surface on its treated face and a faster wear on the untreated surface. This differential in hardness will cause the cutting edge to be self sharpening.

It is an objective of this invention to provide an ordinary, or everyday use, handheld knife with a wear-resistant cutting surface on one edge side of the blade, which satisfies the need for a knife to be suitable for extended use and which also has high wear-ability and durability.

Another objective of this invention is to provide a knife having a cutting edge surface that has anti-wear characteristics while cutting/slicing the surface of the work upon use.

Yet another objective of this invention is to provide a cutting edge that eliminates the wear and durability problems of conventional cutting edges used on knives and the like, and to further provide increased wear resistance over current processes.

Another objective of the invention is to disclose a process to provide the designer and maker of knives with an economical, simple to apply improvement to the cutting edge of any knife design for edge holding and cutting reliability.

An additional objective is to provide a cutting edge which accomplishes the foregoing objects which is readily and economically applied, requiring a very simple operation on an otherwise finished cutting or handheld knife tool that does not require expensive tools or processes.

Other objectives and advantages of this invention will become apparent from the following description taken in conjunction with any accompanying drawings wherein are set forth, by way of illustration and example, certain embodiments of this invention. Any drawings contained herein constitute a part of this specification and include exemplary embodiments of the present invention and illustrate various objects and features thereof.

BRIEF DESCRIPTION OF THE DRAWINGS

The patent or application contains at least one drawing executed in color. Copies of this patent or patent application publication with color drawings will be provided by the Office upon request and payment of the necessary fee.

FIG. 1 is a pictorial view of a conventional knife blade;

DETAILED DESCRIPTION OF THE PREFERRED EMBODIMENT

Figure 4:
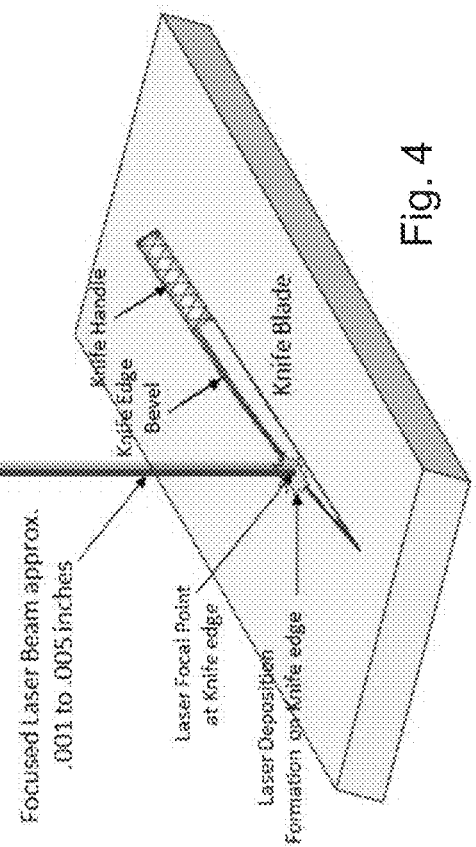
FIG. 4 is a pictorial view of a surface table with a holding fixture.
Figure 2:
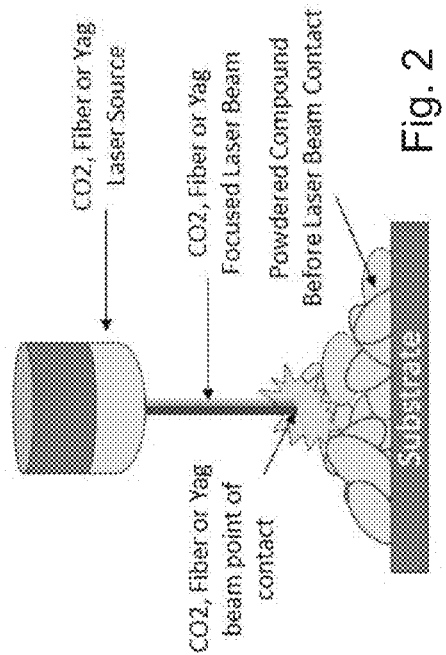
FIG. 2 is a pictorial view of a substrate with a powdered compound.
Figure 3:
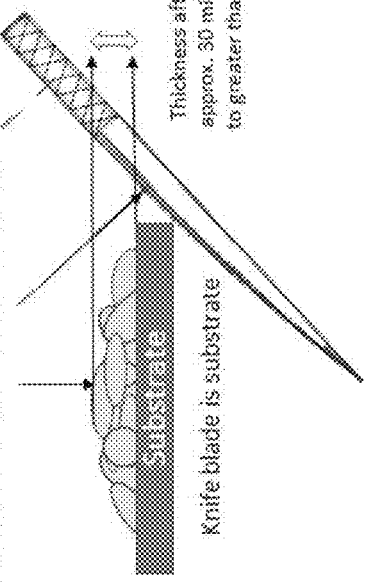
FIG. 3 is a pictorial view of a substrate during laser deposition.

While the disclosed invention can be used on any type of cutting edge, to simplify the disclosure a knife blade is illustrated. Now referring to FIG. 1, set forth is a pictorial of a knife blade with each edge defined. In particular, the knife blade illustrated is a shank or blade (10) having a point (A). The edge (B) of the blade is defined as the sharpened side that extends from the point to the ricasso (E). The bevel (C) is the sloping area that falls from the spine of the blade towards the edge (B). The bevel (C) is angled from 10-25 degrees. The back (D) of the blade is the opposite side of the edge (B). The ricasso (E) is the flat section of the blade between the tang (F) and the start of the bevel (C) and the tang (F) is the protrusion of the blade in the handle of a conventional knife.

The method disclosed employs laser surface modification of a knife edge by adding a surface layer or coating via laser alloying, laser cladding or coating, laser sintering or laser deposition of a wear -resistant cutting edge here-in referred to "laser Deposition" process. The knife edge wedge shaped design of various geometries and is a simple force-multiplying tool that does its work at the edge.

The method treats a cutting edge with an alloy of various carbides or mineral coatings to form a high endurance cutting edge that is self sharpening. The cutting edge has one side of its bevel treated with an laser deposition (sintering) process and a compound coating such as: Diamond powder ranging from 0-0.2 microns (200,000 grit) up to 30 microns (600 grit). However, if these are no longer available then; substances above 5 on the Mohs scale of mineral hardness such as:

5-apatite (tooth enamel), zirconium, palladium, obsidian (volcanic glass);

5.5-beryllium, molybdenum, hafnium, glass, cobalt;

6-orthoclase, titanium, manganese, germanium, niobium, rhodium, uranium;

6-7 fused quartz, iron pyrite, silicon, ruthenium, iridium, tantalum, opal, peridot, tanzanite, jade;

7-osmium, quartz, rhenium, vanadium;

7.5-8-emerald, hardened steel, tungsten, spinel;

8-topaz, cubic zirconia;

8.S-chrysoberyl, chromium, silicon nitride, tantalum carbide;

9-corundum, tungsten carbide, titanium nitride, sapphire;

9-9.5-silicon carbide (carborundum), titanium carbide;

9.S-10-boron, boron nitride, rhenium diboride (a-axis), [16] stishovite, titanium diboride;

10-diamond, carbonado;

Knife edges last longer if the cutting edge is diamond particle bonded or other such as boron carbide, silicon carbide, Tungsten carbide and titanium carbide as well as many mineral powder exceeding 5 on the mohs hardness scale have been utilized as a tooling and engineering material in many industrial applications as they exhibit superior toughness and abrasion resistance given its high hardness.

The coating of the composition ranges from greater than 0 microns up to 30 microns and can be used as a substitute to create a wear resistant surface. The coating providing an abrasion resistant cutting edge and creates a differential hardness on the total cutting edge thereby extending its cutting ability through a wear-resistant surface on its treated face and a faster wear on the untreated surface causing the cutting edge to be self sharpening.

The coating can be applied using an airbrush sprayer, dipping and rolling edge in a shallow pan, dipping the entire blade into the container of compound, a paint brush, pouring the compound onto a surface then leveling out the compound with a straight edge, rolling the compound on with a small roller tool, using a small bulb syringe designed to spray dry or wet compound. The preferred embodiment is the use of an airbrush paint applicator which provides control in the thickness and area of application of the compound. The compound is applied in a final bonded coating of 30 microns down to greater than 0 microns at the edge. The bevel on each side of the blade and is applicable to various knife edge designs including hollow grind; flat grind; high flat grind; v-grind; chisel grind; convex grind; compound grind and asymmetrical grind. In a secondary embodiment, the process for applying the coating is a dip and roll of the edge in a shallow container to control the even coating for laser deposition.

The preferred material used is a diamond powder or synthetic diamond powder with no additives greater than 0 microns to less than 30 microns.

Figure 5:
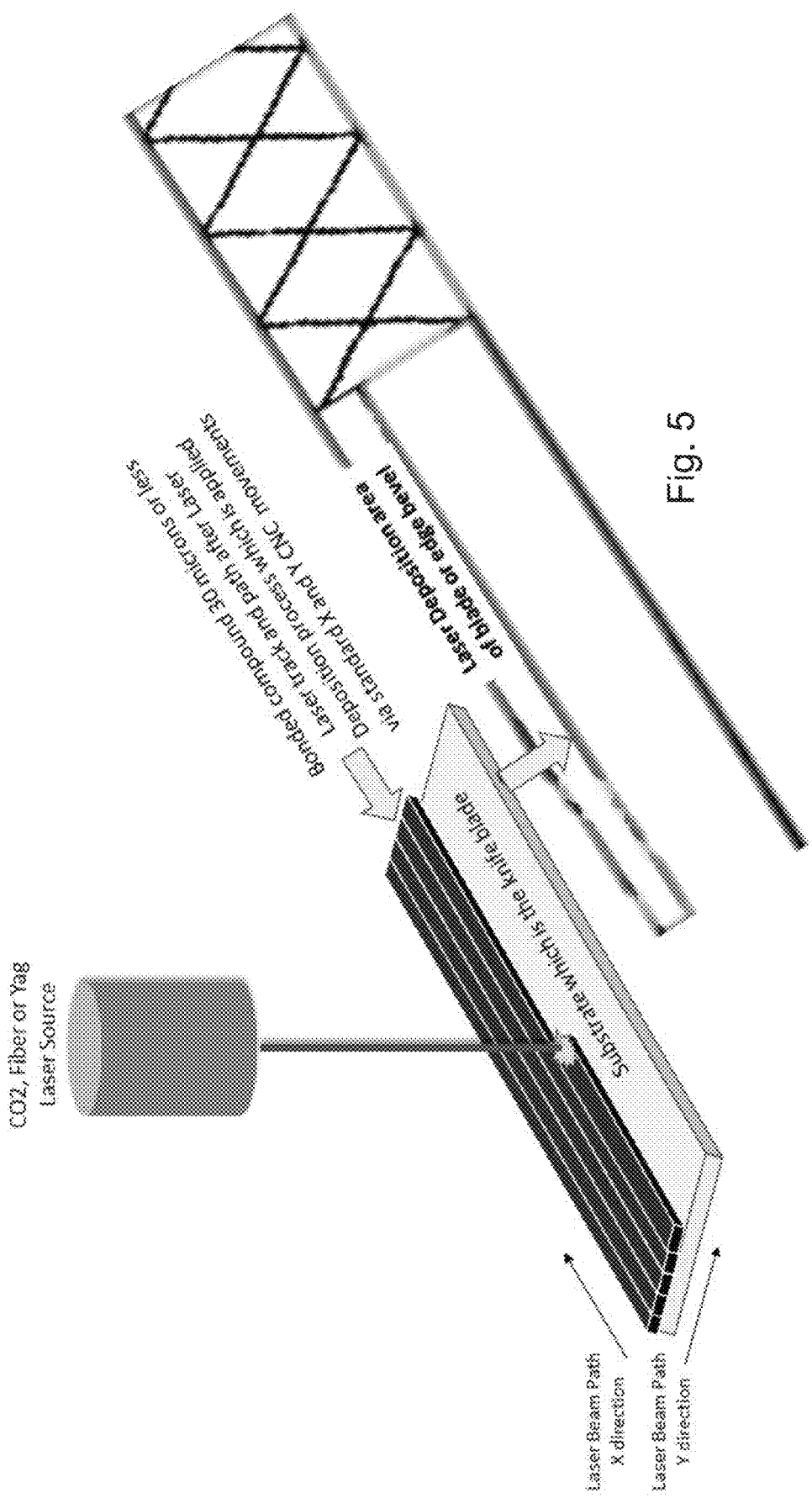
FIG. 5 is a pictorial view of a laser track path.
Figure 6:
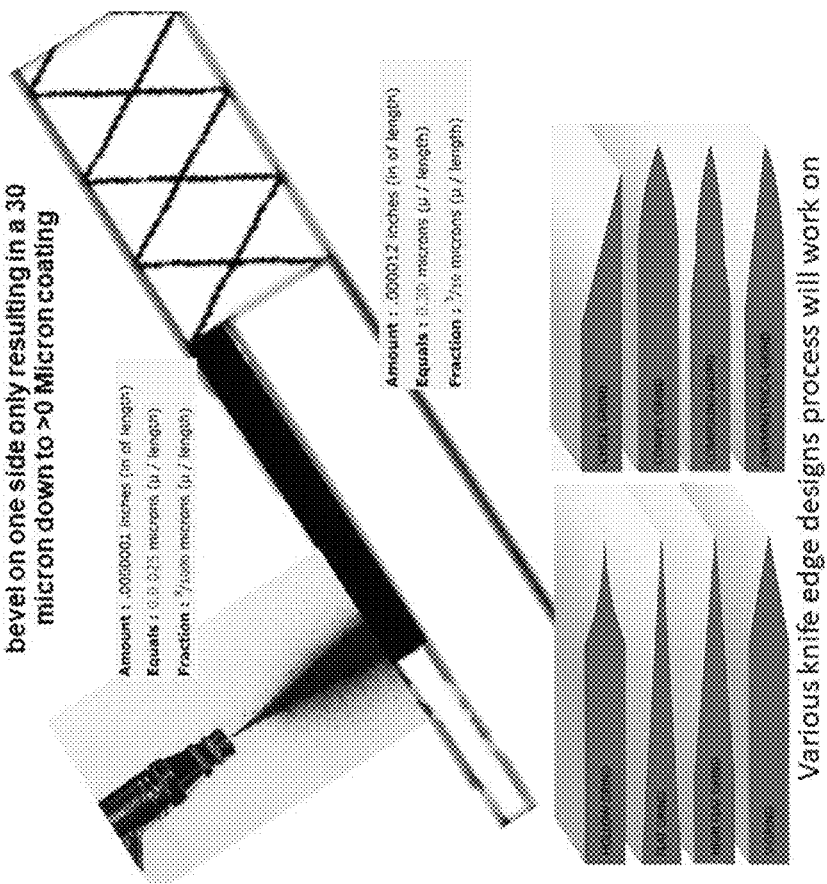
FIG. 6 is a pictorial illustration of an airbrush application and a shallow tank application.
Figure 7:
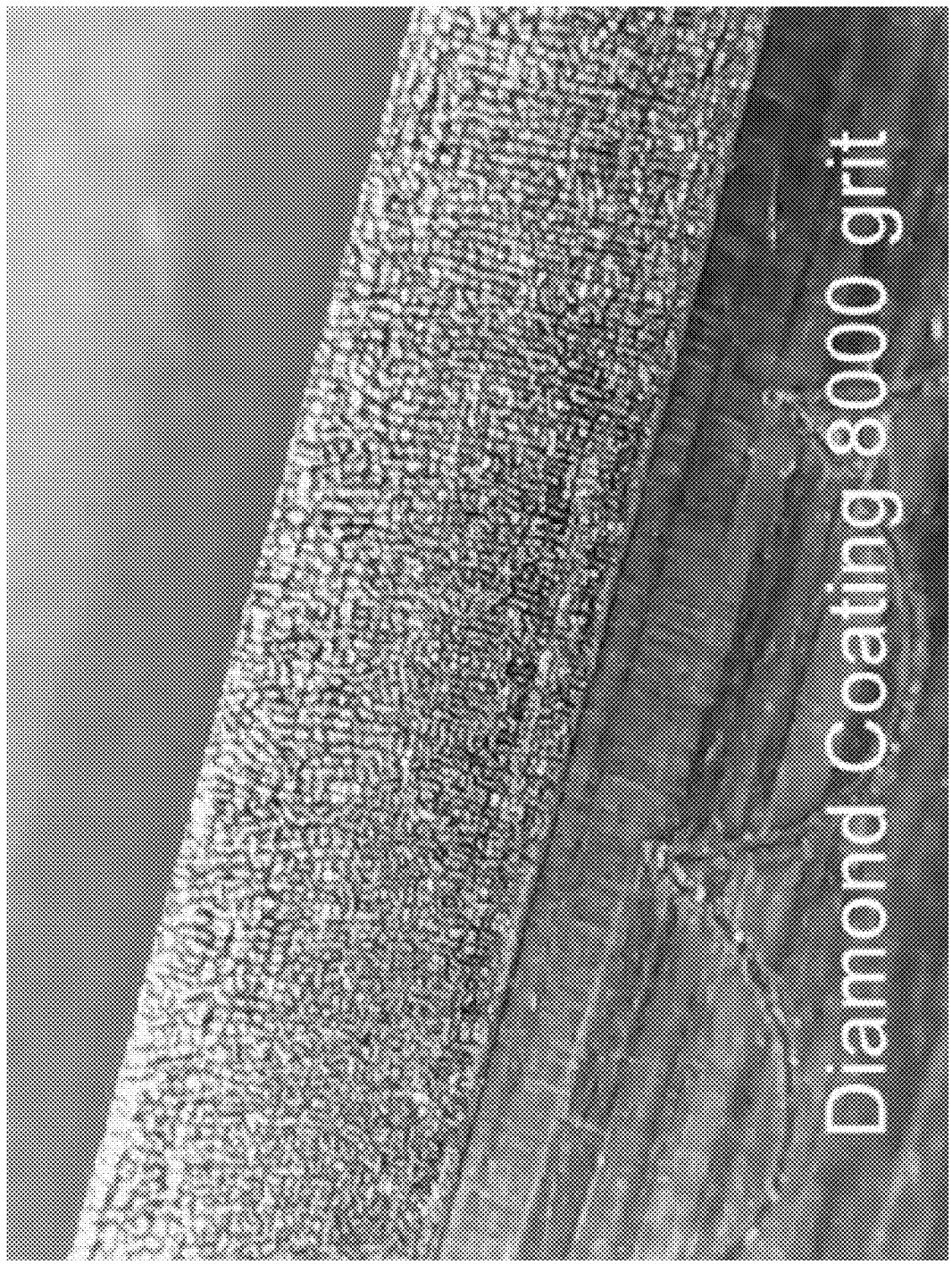
FIG. 7 is an enlarged view of a diamond coating.

The laser source is a CO2, Fiber or YAG laser with a focused beam of about 0.001 to 0.005 inches to impregnate the compound onto the surface of the blade by causing the material to melt and bond with the substrate of the blade. A laser track and path is applied by X and Y CNC movements forming strips as depicted in FIG. 5.

The preferred equipment used for development and testing is the Universal Laser Systems Model VLS3.50 Desktop with a 10.6 micron CO2 Laser at 50 watts. Speed setting for Raster and vector application was 2% up to 25% setting.

The instant invention allows the average consumer to treat the edges of blades to provide better greater efficiency in operation and for increasing the longevity of the cutting blade. For instance, when a lawn mover blade is properly sharpened, the lawn is cut at a precise angle eliminating the tearing of the grass and saving fuel as the engine need not work as hard to accomplish the same goal. Similarly, an ice scraper is placed under extreme stress when drawn over a cement surface, the immediate dulling of the blade leads to a higher workload by the individual tasked in removing the ice. Another example is the filleting of fish, a dull knife resulting in tearing of the fish flesh causing a higher workload and lessens the ability to properly harvest all the fish. The instant invention provide a low cost method of treating one surface of a knife edge allowing an opposing surface to wear allowing the blade to become sharper with wear.

All patents and publications mentioned in this specification are indicative of the levels of those skilled in the art to which the invention pertains. All patents and publications are herein incorporated by reference to the same extent as if each individual publication was specifically and individually indicated to be incorporated by reference.

It is to be understood that while a certain form of the invention is illustrated, it is not to be limited to the specific form or arrangement herein described and shown. It will be apparent to those skilled in the art that various changes may be made without departing from the scope of the invention and the invention is not to be considered limited to what is shown and described in the specification and any drawings/figures included herein.

One skilled in the art will readily appreciate that the present invention is well adapted to carry out the objectives and obtain the ends and advantages mentioned, as well as those inherent therein. The embodiments, methods, procedures and techniques described herein are presently representative of the preferred embodiments, are intended to be exemplary and are not intended as limitations on the scope. Changes therein and other uses will occur to those skilled in the art which are encompassed within the spirit of the invention and are defined by the scope of the appended claims. Although the invention has been described in connection with specific preferred embodiments, it should be understood that the invention as claimed should not be unduly limited to such specific embodiments. Indeed, various modifications of the described modes for carrying out the invention which are obvious to those skilled in the art are intended to be within the scope of the following claims.

What is claimed is:

1. A process for making a self sharpening knife cutting edge comprising the steps of:
   shaping an alloy shank to include a blade section defining a cutting edge, said blade section having a first bevel extending from said cutting edge defining a first side of said blade section and a second bevel extending from said cutting edge defining a second side of said blade section,
   said first bevel and said second bevel forming a V-shaped angle from 10 to 25 degrees from said cutting edge;
   coating only said first bevel with a composition, said composition coating having a thickness from 0.02 microns to 30 microns;
   laser deposition of said composition coating on said first bevel of said blade section;
   wherein said non-coated second bevel wears before the composition coating on said first bevel whereby said blade section is self sharpening as said non-coated second bevel wears.

2. The process for making a self sharpening cutting edge according to claim 1 wherein said composition is a Diamond powder.

3. The process for making a self sharpening cutting edge according to claim 1 wherein said composition is above 5 on the Mohs scale of mineral hardness.

4. The process for making a self sharpening cutting edge according to claim 3 wherein said composition is selected from the group consisting of: 5-apatite (tooth enamel), zirconium, palladium, obsidian (volcanic glass) ; 5.5-beryllium, molybdenum, hafnium, glass, cobalt; 6-orthoclase, titanium, manganese, germanium, niobium, rhodium, uranium; 6-7-fused quartz, iron pyrite, silicon, ruthenium, iridium, tantalum, opal, peridot, tanzanite, jade; 7-osmium, quartz, rhenium, vanadium; 7.5-8-emerald, hardened steel, tungsten, spinel; 8-topaz, cubic zirconia; 8.S-chrysoberyl, chromium, silicon nitride, tantalum carbide; 9-corundum, tungsten carbide, titanium nitride, sapphire; 9-9.5-silicon carbide (carborundum), titanium carbide; 9.S-10-boron, boron nitride, rhenium diboride (a-axis), [16] stishovite, titanium diboride or 10-diamond, carbonado.

5. The process for making a self sharpening cutting edge according to claim 1 wherein said alloy shank is titanium or any other metal alloy.

6. The process for making a self sharpening cutting edge according to claim 1 wherein said alloy shank has a Rockwell C hardness of about 65 or less.

\* \* \* \* \*